US011550887B2

(12) United States Patent
Benkreira et al.

(10) Patent No.: US 11,550,887 B2
(45) Date of Patent: Jan. 10, 2023

(54) COMPUTER-BASED SYSTEMS FOR A REAL-TIME GENERATION OF CHALLENGE QUESTIONS BASED ON USER-INPUTTED DATA ELEMENTS AND METHODS OF USE THEREOF

(71) Applicant: Capital One Services, LLC, McLean, VA (US)

(72) Inventors: Abdelkader M'Hamed Benkreira, New York, NY (US); Phoebe Atkins, McLean, VA (US); Andrea Montealegre, Arlington, VA (US); Nagaraju Gaddigopula, McLean, VA (US); William Prior, McLean, VA (US); Daniel John Marsch, Arlington, VA (US)

(*) Notice: Subject to any disclaimer, the term of this patent is extended or adjusted under 35 U.S.C. 154(b) by 113 days.

(21) Appl. No.: 17/123,488

(22) Filed: Dec. 16, 2020

(65) Prior Publication Data
US 2022/0188389 A1    Jun. 16, 2022

(51) Int. Cl.
*H04L 29/06* (2006.01)
*G06F 21/31* (2013.01)
*G06F 21/40* (2013.01)

(52) U.S. Cl.
CPC ............ *G06F 21/316* (2013.01); *G06F 21/40* (2013.01); *G06F 2221/2103* (2013.01)

(58) Field of Classification Search
CPC . G06F 21/316; G06F 21/40; G06F 2221/2103

USPC ............................................................ 726/5
See application file for complete search history.

(56) References Cited

U.S. PATENT DOCUMENTS

| 11,005,839 B1* | 5/2021 | Shahidzadeh ......... H04W 12/06 |
| 2010/0042533 A1* | 2/2010 | Rose .................. G06Q 20/1085 |
| | | 705/38 |
| 2017/0289168 A1* | 10/2017 | Bar ....................... G06F 21/316 |

\* cited by examiner

*Primary Examiner* — Evans Desrosiers
(74) *Attorney, Agent, or Firm* — Greenberg Traurig, LLP

(57) ABSTRACT

A method and system include receiving, by a processor of a server, from a computing device associated with a user, real-time user activity data identifying at least one activity performed on the computing device. User-inputted data elements from a plurality of elements of a graphical user interface displayed on the computing device are received, which identify user-specific data attributes. Potential user-specific knowledge information is identified from databases based on at least one user-specific data attribute. User-specific challenge questions based on the potential user-specific knowledge information are generated and displayed on the user's computing device. Answers to the user-specific challenge questions by the user are received. An answer score based on correct answers and a behavioral score based the real-time user activity data of the user are determined. The processor determines whether the user is or is not a fraudster based on the answer score and the behavioral score.

20 Claims, 11 Drawing Sheets

Online From

- 122 → First Name : Jonh
- 124 → Last Name : Smith
- 126 → Address : 7&5 Peachtree Lane
- 128 → City : Atlanta
- 130 → State : GA ▾
- 132 → Zip Code : 30310
- 134 → Date of Birth : May 15, 1960
- 136 → How Many Years Resident At Address : 40 Years
- 138 → Do You     Own ⦿   Rent ○   Other ☐
- 140 → Monthly Mortgage/Rent : $1125
- 142 → Employer : XYZ Legal Associates
- 144 → Job Function : Lawyer
- 146 → How Many Years at Current Employer : 15 Years
- 148 → Annual Income : $ 78,000

┌─────────────────────────────────────────────────────────┐
│ 210 ⟶ What Weather Event Took Place in your Region in the Last Week? │
│         A. Snowstorm                                    │
│         B. None                                         │
│ 215 ⟶  C. Rain Shower                                   │
│         D. Gale-force Winds                             │
│                                                         │
│ 217 ⟶ Your Answer  [B ▾]                                │
└─────────────────────────────────────────────────────────┘

┌─────────────────────────────────────────────────────────┐
│ 230 ⟶ Which Street is within 1000 Ft of your Address?   │
│         A. Hibiscus Way                                 │
│         B. 5th Avenue                                   │
│ 235 ⟶  C. 77th Street West                              │
│         D. Orange Grove Road                            │
│                                                         │
│ 237 ⟶ Your Answer  [D ▾]                                │
└─────────────────────────────────────────────────────────┘

┌─────────────────────────────────────────────────────────┐
│ 250 ⟶ What Cartoon Appeared on TV When you were a Child? │
│         A. Leave it to Beaver                           │
│         B. Pokemon                                      │
│ 255 ⟶  C. Flintstones                                   │
│         D. Powerbirds                                   │
│                                                         │
│ 257 ⟶ Your Answer  [C ▾]                                │
└─────────────────────────────────────────────────────────┘

> 270 ⟶ What is the Nearest Baseball Team Associated with your City/town?
> 275 ⟶
> - A. Lakers
> - B. Braves
> - C. Yankees
> - D. Mohicans
>
> 277 ⟶ Your Answer [B ▽]

> 290 ⟶ What was the Mascot of your Baseball Team in the 1980s?
> 295 ⟶
> - A. Lassie
> - B. Pocahontas
> - C. Chief Noc-a-homa
> - D. Crocodile
>
> 297 ⟶ Your Answer [C ▽]

> Your Application was Approved !!!!

> Your Application will Require Further Consideration. You will Hear from Us within 5-7 Business Days.

FIG. 4G

COMPUTER-BASED SYSTEMS FOR A REAL-TIME GENERATION OF CHALLENGE QUESTIONS BASED ON USER-INPUTTED DATA ELEMENTS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to computing systems and more specifically to computer-based systems for a real-time generation of challenge questions based on user-inputted data elements and methods of use thereof.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that may include at least the following components/steps of receiving, by a processor of a server, in real-time over a communication network, from a computing device associated with a user, real-time user activity data identifying at least one activity performed on the computing device by the user. A plurality of user-inputted data elements from a plurality of interface elements of a graphical user interface may be displayed on a display of the computing device may be received, by the processor, in real time from the computing device. The plurality of user-inputted data elements may identify a plurality of user-specific data attributes of the user. Potential user-specific knowledge information of the user based at least in part on at least one user-specific data attribute of the plurality of user-specific data attributes may be identified, by the processor, in real-time over the communication network from a plurality of databases. At least one user-specific challenge question based at least in part on the potential user-specific knowledge information may be generated, in real-time, by the processor. A computer instruction configured to cause the computing device to display the at least one user-specific challenge question to the user on the display of the computing device may be transmitted, by the processor, over the communication network to the computing device. An answer to the at least one user-specific challenge question by the user may be received by the processor over the communication network from the computing device. An answer score to the user based at least in part on the answer being a correct answer based on the potential user-specific knowledge information of the user may be determined by the processor. A behavioral score of the user based at least in part on the real-time user activity data of the user may be determined by the processor. The processor may determine whether the user is or is not a fraudster based at least in part on: i) the answer score and ii) the behavioral score. The processor may perform one of: i) accepting the plurality of user-inputted data elements when the user is not the fraudster, or ii) rejecting the plurality of user-inputted data elements when the user is the fraudster.

In some embodiments, the present disclosure provides an exemplary technically improved computer-based system may include at least the following components of a memory for storing computer code and a processor configured to execute the computer code that causes the processor to receive in real-time over a communication network, from a computing device associated with a user, real-time user activity data identifying at least one activity performed on the computing device by the user; to receive in real time from the computing device, a plurality of user-inputted data elements from a plurality of interface elements of a graphical user interface displayed on a display of the computing device, where the plurality of user-inputted data elements may identify a plurality of user-specific data attributes of the user; to identify in real-time over the communication network from a plurality of databases, potential user-specific knowledge information of the user based at least in part on at least one user-specific data attribute of the plurality of user-specific data attributes; to generate in real-time, at least one user-specific challenge question based at least in part on the potential user-specific knowledge information; to transmit over the communication network to the computing device, a computer instruction configured to cause the computing device to display the at least one user-specific challenge question to the user on the display of the computing device; to receive over the communication network from the computing device, an answer to the at least one user-specific challenge question by the user; to determine an answer score to the user based at least in part on the answer being a correct answer based on the potential user-specific knowledge information of the user; to determine a behavioral score of the user based at least in part on the real-time user activity data of the user; to determine whether the user is or is not a fraudster based at least in part on: i) the answer score and ii) the behavioral score; and to perform one of: i) accepting the plurality of user-inputted data elements when the user is not the fraudster, or ii) rejecting the plurality of user-inputted data elements when the user is the fraudster.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2 depicts an exemplary graphic user interface for inputting user-inputted data elements in accordance with one or more embodiments of the present disclosure;

FIGS. 4A-4G depict exemplary snapshots of a graphic user interface displaying user-specific challenge questions based on user-inputted data elements in accordance with one or more embodiments of the present disclosure;

DETAILED DESCRIPTION

Figure 1:
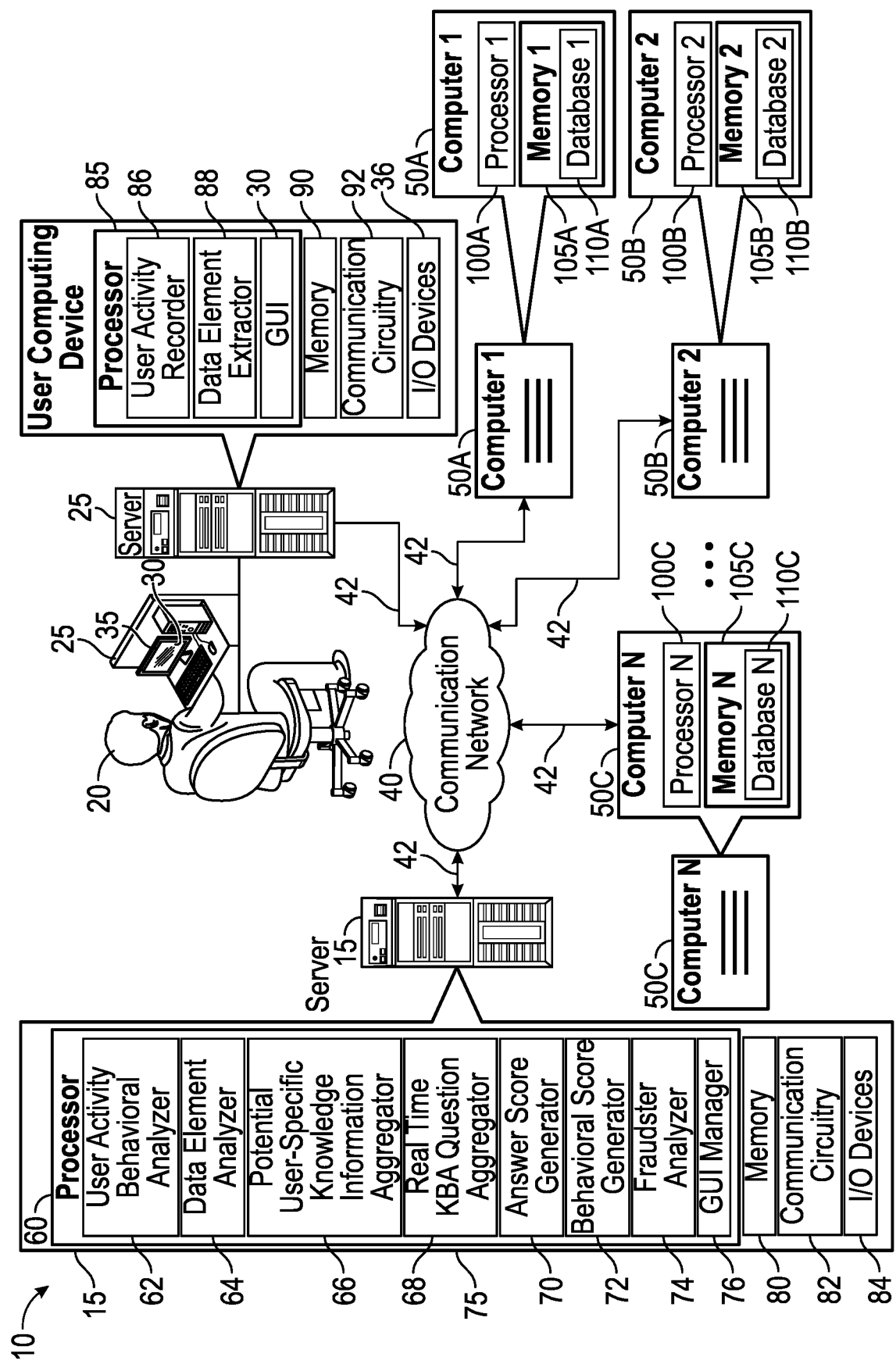
FIG. 1 depicts a computer-based system for a real-time generation of challenge questions based on user-inputted data elements in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein describe a system and method for a real-time generation of challenge questions based on user-inputted data elements. The challenge questions may be used to authenticate the identity of the user. The challenge questions may be generated in real-time as the user enters data elements into a plurality of interface elements of a graphic user interface (GUI) displayed on a computing device of the user. The GUI may display an online form, for example, which may include a plurality of interface elements, such as data fields for the user to enter personal data, or user-specific data attributes.

In some embodiments, a plurality of user-specific data attributes may then be used in real time to identify user-specific knowledge information in a plurality of databases that the user may potentially know. At least one user-specific challenge question may be generated from the potential user-specific knowledge information to be presented to the user for authentication. User authentication may be based on an answer score, and/or on a behavioral score as to the manner in which the user entered the user-inputted data elements. For example, if the system detects that user left the online form to look up answers on another web page, or the user does not provide an answer to the at least one user-specific challenge question in a predefined time interval, the behavioral score may be reduced and may be indicative of a fraudster.

FIG. 1 depicts a computer-based system 10 for a real-time generation of challenge questions based on user-inputted data elements in accordance with one or more embodiments of the present disclosure. The system 10 may include a server 15, a computing device 25 of a user 20, and a plurality of N computers 50A, 50B, and 50C denoted as COMPUTER1, COMPUTER2, . . . COMPUTERN, where N is an integer, communicating 42 over a communication network 40. Each of the plurality of N computers may include a plurality of N processors 100A, 100B, and 100C denoted PROCESSOR1, PROCESSOR2, . . . PROCESSORN, and a plurality of N memories 105A, 105B, and 105C denoted MEMORY1, MEMORY2, . . . MEMORYN storing a respective plurality of databases 110A, 110B, and 110C denoted DATABASE1, DATABASE2, . . . DATABASEN.

In some embodiments, the server 15 may include a processor 60, a memory 80, a communication circuitry 82 for communicating 42 over the communication network 40, and/or input/output (I/O) devices 84. The processor 60 may be configured to execute computer code stored in the memory 80 such as the following software modules: a user activity behavioral analyzer module 62, a data element analyzer module 64, a potential user-specific knowledge information aggregator module 66, a real-time knowledge based authentication (KBA) question aggregator module 68, an answer score generator module 70, a behavioral score generator module 72, a fraudster analyzer module 74, and/or a graphic user interface (GUI) manager module 76.

In some embodiments, the computing device 25 of the user 20 may include a processor 85, a memory 90, a communication circuitry 92 for communicating 42 over the communication network 40, and/or input/output (I/O) devices 36 such as a display 35 displaying a graphic user interface (GUI) 30. The processor 85 may be configured to execute computer code stored in the memory 90 such as the following software modules: a user activity recorder module 86, a data element extractor module 88, and/or the GUI 30.

FIG. 2 depicts the graphic user interface 30 for inputting user-inputted data elements in accordance with one or more embodiments of the present disclosure. The GUI 30 may display an online form, for example, to the user 20. The GUI 30 may have a plurality of interface elements such as data fields for entering personal data. For example, the GUI 30 may request that user 20 enter the following personal data into the plurality of interface elements as follows: a first name 122, a last name 124, an address 126, a city 128, a state 130, a zip code 132, a date of birth 134, a number of years 136 resident at the address 126, a question 138 whether the user 20 owns, rents the property at the address 126, a monthly mortgage or rent payment 140, an employer 142, a job function 144, a number of years 146 working for the employer 142, and/or an annual income 148. For the example shown in GUI 30, the user 20 may be John Smith, who lives at 785 Peachtree Lane in Atlanta, Ga. 30310. John Smith was born on May 15, 1960 and lived at 785 Peachtree Lane for 40 years, which he owns and pays a $1,125 monthly mortgage. John Smith works at XYZ Legal Associates for 15 years and is a lawyer earning $78,000.

In some embodiments, the server 15 may be managed by an entity, such as a financial institution, a bank, a credit card company, corporation, partnership, limited partnership, limited liability company, for example. The entity may use the online form as an application for products of the entity, such as applications for payment cards, bank accounts, loans, etc., if the entity is a financial institution, for example. The entity may be concerned that a fraudster may try to pose as a real user and may try to fraudulently apply for products of the entity in place of a real user, thus stealing the identity of the real user. Accordingly, at least one user-specific challenge question may be generated in real-time using the personal data in the plurality of user-inputted data elements entered by the user 20 into the plurality of interface elements on the online form.

The example above may be used to illustrate the technical problem solved by the embodiments disclosed herein. The user 20 John Smith enters personal data into the plurality of interface elements (e.g., data fields) on the online form. This personal data may be easily found by fraudsters in a variety of public databases. The technical solution to this problem uses the personal data entered into the form in real-time to generate at least one user-specific challenge question known to the user, but not to the fraudster, based on potential user-specific knowledge information generated using the plurality of user-specific data attributes (e.g., personal data) as described in the following figure. The processor 85 may send and/or stream the plurality of user-specific data attributes extracted by data element extractor module 88 over the communication network 40 to data element analyzer 64 in the server 15.

In some embodiments, as the user enters the plurality of user-inputted data elements into the plurality of interface elements, processor 85 may monitor the behavior of the user 20 entering the data. The processor 85 may use the user activity recorder module 86 such as Clickstream, for example, or any other suitable user activity recorder software. For example, a fraudster may leave the webpage displaying the online form on GUI 30 to retrieve the personal data of the target identity theft victim to enter into the data fields, look up answers to the at least one challenge question in other websites and/or may enter the personal data in a time interval greater than a predefined time interval. These events, characteristic of a fraudster, may be tracked and/or monitored by the user activity recorder module 86. Subsequently, the recorded events made by the user 20 on GUI 30 may be transmitted or streamed by the processor 85 over the communication network 40 to the user activity behavioral analyzer module 62 on the server 15.

Figure 3:
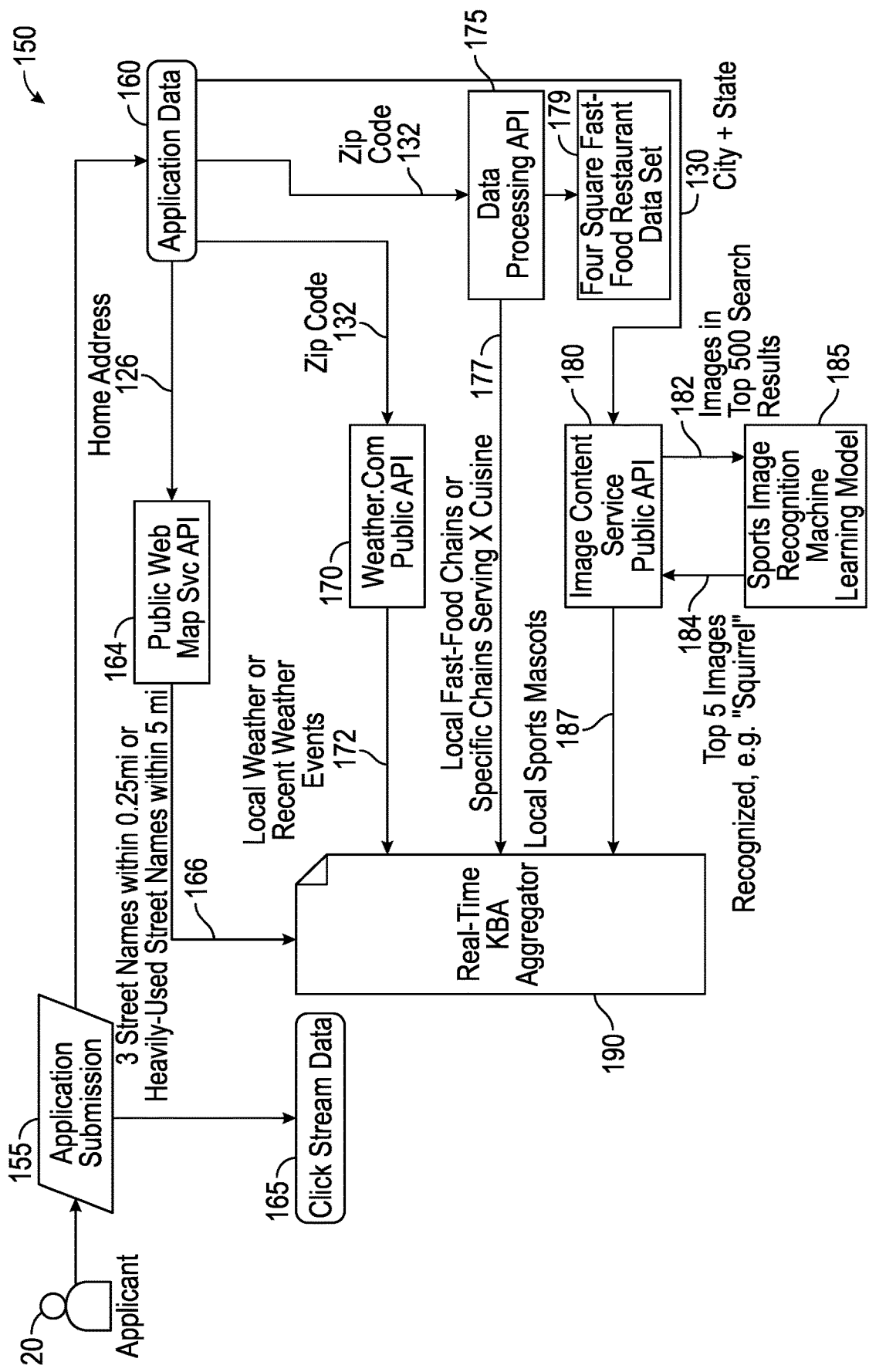
FIG. 3 depicts a block diagram of an exemplary flow for identifying potential user-specific knowledge information based on user-inputted data elements in accordance with one or more embodiments of the present disclosure.

FIG. 3 depicts a block diagram of an exemplary flow 150 for identifying potential user-specific knowledge information based on user-inputted data elements in accordance with one or more embodiments of the present disclosure. As the user 20 inputs user-inputted data elements into an application 155 on GUI 30, for example, the data element extractor module 88 may extract the plurality of user-specific attributes, such as application data 160 from the application 155, which may be sent over the communication network 40 to data element analyzer 64 running on the server 15. Similarly, the user activity recorder 86 running an application such as Clickstream, for example, may send clickstream data 165 over the communication network 40 to the user activity behavioral analyzer 62 running on the server 15.

In some embodiments, the plurality of user-specific attributes extracted from the application data 160 such the user's home address 126, and/or the user's zip code 132 may be used to identify potential user-specific knowledge information in a plurality of databases 110A, 110B, 110C over the communication network 40. Potential user-specific knowledge information may be, for example, information that the user may potentially know based on, but not limited to the user's age, life experiences, residence, and/or place of work, for example. Once the data element analyzer module 64 sends the user-specific data attributes of the user 20 from the application data 160, for example, to the potential user-specific knowledge information aggregator module 66, processor 60 may search large datasets, for example, stored in the plurality of databases 110A, 110B, 110C stored in the plurality of computers 50A, 50B, 50C over the communication network 40 to identify in real-time potential user-specific knowledge information.

In some embodiments, regarding the exemplary flow 150 shown in FIG. 3, the user's home address 126 may be sent to a Public Web Mapping Service Application Program Interface (API) 164 on databases associated, for example, with a Web Mapping Service to identify potential user-specific knowledge information based on the user's address 126, such as three street names within 0.25 miles or the street names of heavily used streets within 5 miles of the user's home address 166, for example.

In some embodiments, the user's zip code 132 may be sent to a public weather station API 170 to identify potential user-specific knowledge information based on the user's zip code 132, such as local weather and/or recent weather events 172, for example.

In some embodiments, the user's zip code 132 may be sent to a data processing API 175 to identify potential user-specific knowledge information based on the user's zip code 132, such as local fast-food chains and/or specific food chains serving a particular type of cuisine 177, for example. As an example, the data processing API 175 may call a dataset such as a FourSquare Fast-Food DataSet 179. The FourSquare Fast-Food DataSet 179 that may be available through a Web-based Marketplace may include visit data to all locations of a fast-food chain in the United States. This dataset may be updated daily.

In some embodiments, the user's city 128 and the user's state 130 may be sent to a Image Content Public API 180 to identify potential user-specific knowledge information based on the user's city 128 and the user's state 130, such as local sports mascots 187, for example. The Image Content Public API 180 may input images 182 in the top 500 search results to a sports Image Recognition Machine Learning Model 185 which may output 184 top 5 recognized images 184 to the Image Content Public API 180 to generate the local sport mascots 187.

In some embodiments, the potential user-specific knowledge information such as the local weather and/or recent weather events 172, the local fast-food chain and/or specific food chain serving a particular type of cuisine (denoted as "x cuisine" in FIG. 3), and/or local sports mascots 187 may be input to a real-time KBA Question Aggregator module 190 (e.g., the same software module as the real-time KBA question aggregator module 68 in FIG. 1) to generate in real-time at least one user-specific challenge question based on the potential user-specific knowledge information.

FIGS. 4A-4G depict exemplary snapshots of the GUI 30 displaying user-specific challenge questions based on user-inputted data elements in accordance with one or more embodiments of the present disclosure. The Real-Time KBA Question Aggregator 66 may generate the at least one user-specific challenge question on the server 15 which may be relayed to the GUI manager 76. The GUI manager 76 may control via the communication network 40 what is displayed to the user 20 on the GUI 30 as shown in the following exemplary GUI snapshots.

FIG. 4A depicts a first exemplary snapshot 200 of GUI 30 of a first exemplary user-specific challenge question 210 based on the user's zip code 132 requesting the user 20 to identify "What weather event took place in your region in the last week?" Four possible answers 215 are displayed to the user 20. The correct answer B 217 may be chosen by the user 20 in a pull-down menu on GUI 30.

FIG. 4B depicts a second exemplary snapshot 220 of GUI 30 of a second exemplary user-specific challenge question 230 based on the user's home address 126 requesting the user 20 to identify "Which street is within 1000 feet of your address?" Four possible answers 235 are displayed to the user 20. The correct answer D 237 may be chosen by the user 20 in a pull-down menu on GUI 30.

FIG. 4C depicts a third exemplary snapshot 240 of GUI 30 of a third exemplary user-specific challenge question 250 based on the user's date of birth 134 requesting the user 20 to identify "Which cartoon appeared on TV when you were a child?" Four possible answers 255 are displayed to the user 20. The correct answer C 257 may be chosen by the user 20 in a pull-down menu on GUI 30. Note that the user 20 is 60 years old (see FIG. 2) and the only cartoon in the four possible answers 255 is the Flintstones from the mid-1960s.

FIG. 4D depicts a fourth exemplary snapshot 260 of GUI 30 of a fourth exemplary user-specific challenge question 270 based on the user's city 128 and the user's state 130 (e.g., Atlanta, Ga.) requesting the user 20 to identify "What is the baseball team associated with your city/town?" Four possible answers 275 may be displayed to the user 20. The correct answer B 277 (e.g., the Atlanta Braves) may be chosen by the user 20 in a pull-down menu on GUI 30.

FIG. 4E depicts a fifth exemplary snapshot 280 of GUI 30 of a fifth exemplary user-specific challenge question 290 based not only on the user's city 128 and the user's state 130 (e.g., Atlanta, Ga.), but also on the on the user's date of birth 134, which requests the user 20 to identify "What was the Mascot of your Baseball Team in the 1980s?". Four possible answers 295 are displayed to the user 20. The correct answer C 297 (e.g., Chief Noc-A-Homa was the mascot of the Atlanta Braves until 1986) may be chosen by the user 20 in a pull-down menu on GUI 30.

In some embodiments, the answer score generator 70 may determine an answer score based on a number of right or wrong answers that the user 20 provided in response to each of the at least one user-specific challenge question. When the answer score is above a predefined threshold, the fraud analyzer 74 may identify the user 20 as a real user. Conversely, when the answer score is below the predefined threshold, the fraud analyzer 74 may identify the user 20 as a fraudster.

In some embodiments, the real time KBA question aggregator 68 may prioritize each of the at least one user-specific challenge question based on a difficulty level and/or security level for each of the at least one user-specific challenge question. In other embodiments, each of the at least one user-specific challenge question may be presented to the user 20 in order from least difficult to most difficult.

In some embodiments, note that the fifth exemplary user-specific challenge question 290 may not be known to the user 20 if the user 20 is not a baseball fan, for example. Perhaps the parent's of the user 20 did not let the user 20 watch cartoons as a child so the user 20 may not remember the Flintstones. As a result, the answer score generator 70 may not only consider a number of right or wrong answers but may also assign weights of difficulty when generating the at least one user-specific challenge question from the potential user-specific knowledge information when based on more than one user-specific data attributes.

In some embodiments, the behavioral score generator 72 may receive behavioral information about the user 20 while filling out the online form or application, or when answering the at least one user-specific challenge question displayed to the user 20 on GUI 20. The behavioral score generator 72 may determine a behavior score based on a set of rules indicative of the behavior of a real user or a fraudster. For example, the user 20 enters the user-inputted data elements into the plurality of interface elements (e.g., data fields), and the user activity behavior analyzer may record the user 20 leaving the page to copy data such as the user's name and/or address and/or date of birth, for example, which may be pasted into the data field. This behavior may be indicative of a fraudster copy/pasting the personal data of a fraud or identify theft victim into the application for a financial product, for example, which may trigger system 10 to generate the at least one challenge questions to further verify if user 20 is a fraudster.

In some embodiments, after the user 20 requests to send the completed application to the financial institution to apply for a financial product, the server 15 may transmit instructions to the computing device 25 of the user 20 that cause the computing device 25 to display the at least one user-specific challenge question to the user 20. If the user 20 does not answer the at least one user-specific challenge question within a predefined time interval, or if the user 20 leaves the page so as to lookup, for example, the mascot of the Atlanta Braves in the 1980s as in FIG. 4E, this behavior may be indicative of a fraudster and the behavioral score reduced, for example.

Note that technical solution for authenticating a user filling out an online form or application as provided herein allows a real user to benefit from the specially generated at least one user-specific challenge question based on the potential user-specific knowledge information that targets the real user. This solution permits the real user to answer the at least one user-specific challenge question quickly and efficiently while filtering out a fraudster that is not familiar potential user-specific knowledge information of the real user.

In some embodiments, the fraudster analyzer 74 of the server 15 may determine whether or not the user 20 is a fraudster based on the answer score and/or on the behavioral score.

In some embodiments, the fraudster analyzer 74 of the server 15 may determine whether or not the user 20 is a fraudster based on a composite weighted score based on the answer score and/or on the behavioral score.

In some embodiments, processor 60 may perform one of: (i) accepting the plurality of user-inputted data elements when the user is not a fraudster, or (ii) rejecting the plurality of user-inputted data elements when the user is the fraudster. Stated differently, processor 60 may reject the application data 160 for processing when the user 20 is a fraudster, or allow the application data 160 to be processed when the user 20 is not a fraudster (e.g., a real user).

FIG. 4F depicts a sixth exemplary snapshot 298 of GUI 30. Upon the fraudster analyzer 74 determining that the user 20 is not a fraudster, processor 60 may further process the application data 160. GUI 30 may display a message 298 "YOUR APPLICATION WAS APPROVED!!!"

FIG. 4G depicts a seventh exemplary snapshot 299 of GUI 30. Upon the fraudster analyzer 74 determining that the user 20 may be a fraudster, the processor 60 may halt any further processing of the application data 160. GUI 30 may display a message 299 "YOUR APPLICATION WILL REQUIRE FURTHER CONSIDERATION. YOU WILL HEAR FROM US WITHIN 5-7 BUSINESS DAYS". The application data 160 may be processed manually, for example, using much more stringent guidelines for authenticating the identity of the user, such as request the user to show up physically to a location of the entity with an identification of the user, for example.

In some embodiments, the user activity behavioral analyzer 62 may receive in real-time from the computing device 25 of the user 20 over the communication network 40, user activity data by receiving metadata from the user's browser session and/or software application running on the computing device 25, which may be streamed in real-time to the server 15.

In some embodiments, the at least one user-specific challenge question may be displayed on the GUI 30 when the user submits the completed online form and/or application.

The embodiments shown in FIGS. 2-4 are merely for visual and conceptual clarity, and not by way of limitation of the embodiments disclosed herein. For example, instead of multiple-choice answers presented to the user 20, an empty field for a free form write-in answer may be given to the user 20 on GUI 30. The answer score generator 70 may apply fuzzy matching algorithms to account for misspelled words, for example.

In some embodiments, the personal data is not limited to the personal data in the online form shown in FIG. 2 but may be any suitable personal data requested by the entity to process the online form. Any data may be requested from the user as user-inputted data elements that may be subsequently used to as search items used to identify the potential user-specific knowledge information in databases 110A, 110B, 110C. Furthermore, any third-party database providing access to big datasets may be used to identify the potential user-specific knowledge information such as in media and/or entertainment databases, for example (e.g., to determine a cartoon shown in the 1960s), as in FIG. 4C. Challenge questions are not limited to the challenge questions shown in FIGS. 4A-4E.

In some embodiments, the at least one user-specific challenge question may be generated from a predefined set of challenge questions. The multiple-choice answers to the predefined set of challenge questions may include a correct answer identified in any one of the databases 110A, 110B, 110C. Furthermore, processor 60 may choose not to present certain challenge questions in the predefined set when ambiguous cases may be detected. For example, consider the challenge question "What is the baseball team associated with your home address?". If the home address entered into the online form is in New York City or its environs, for example, ambiguity may be generated since there are two baseball teams in New York City: the New York Mets and the New York Yankees, so the real-time KBA question aggregator module 68 may choose not to present this particular challenge question.

In some embodiments, the user-specific data attributes extracted from the user-inputted data elements entered by the user into the interface elements of the online form or application may be inputted into a trained machine learning model to output possible correct answers to present to the user 20 in a set of answers such as shown in FIGS. 4A-4E to each of the at least one user-specific challenge question.

Figure 5:
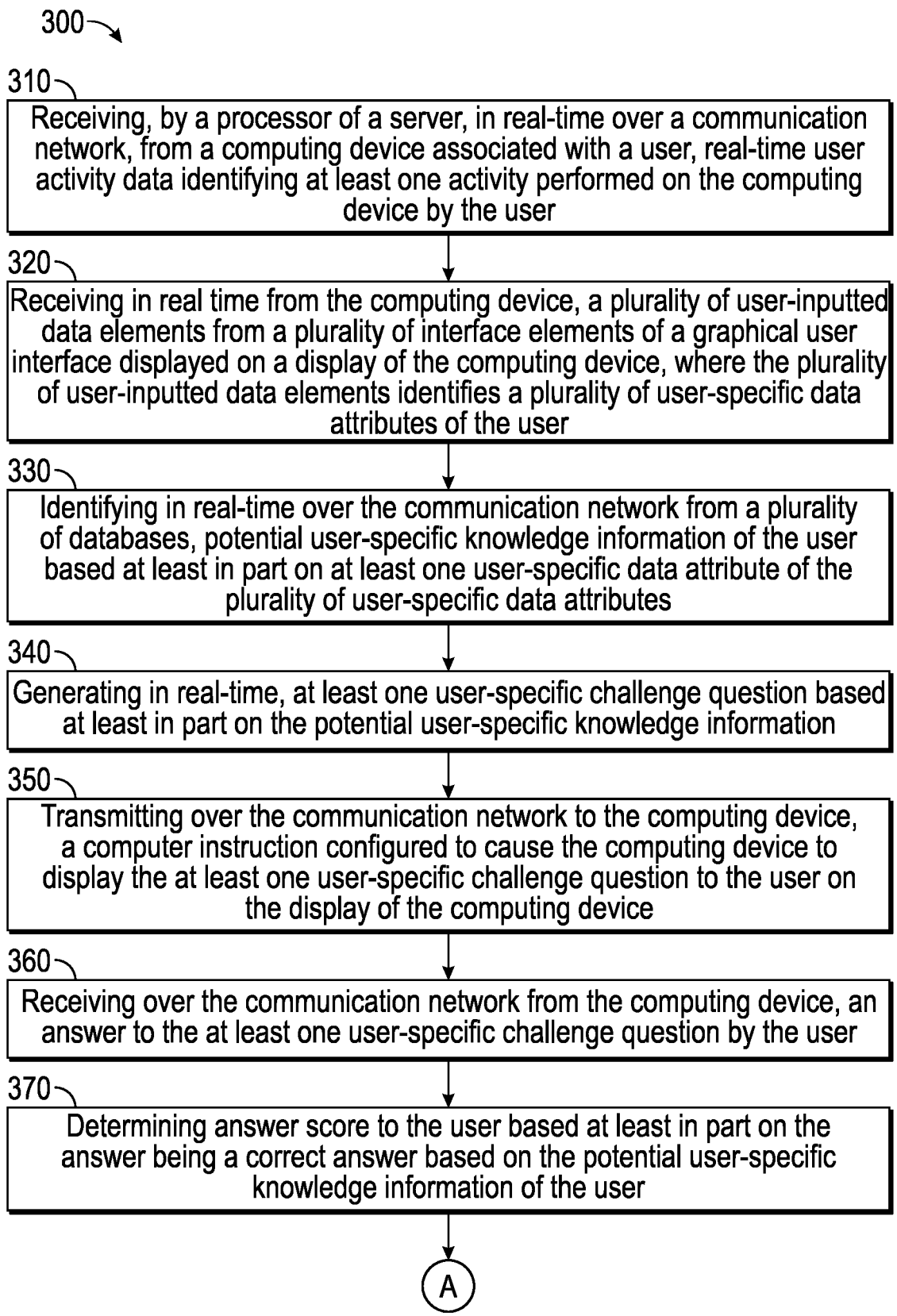
FIG. 5 illustrates a flowchart of a method for a real-time generation of challenge questions based on user-inputted data elements in accordance with one or more embodiments of the present disclosure.
Figure 5:
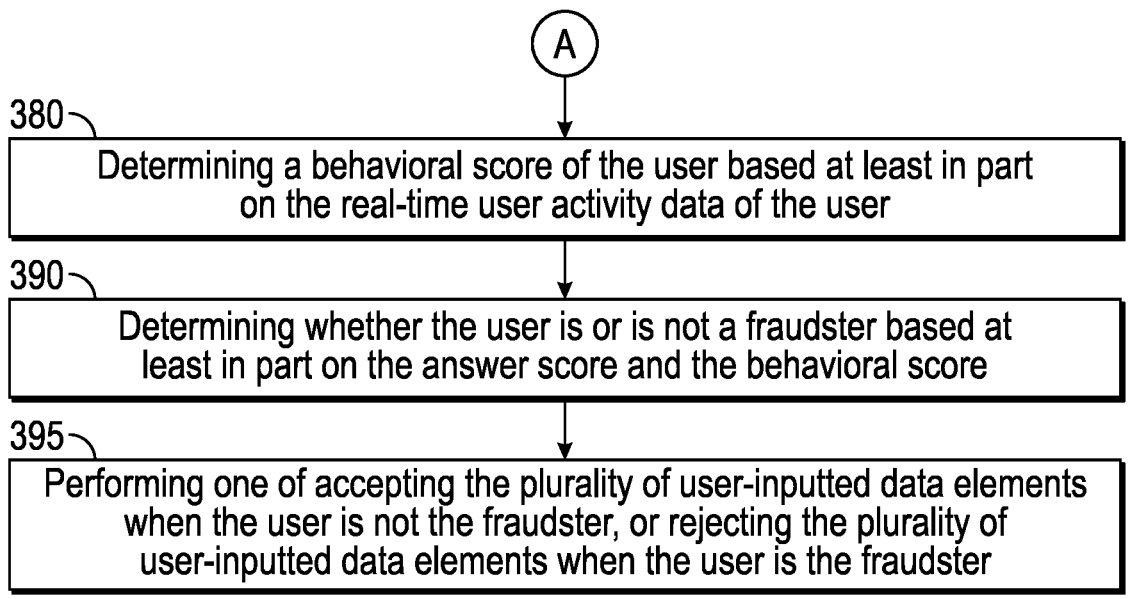

FIG. 5 illustrates a flowchart of a method 300 for a real-time generation of challenge questions based on user-inputted data elements in accordance with one or more embodiments of the present disclosure. Method 300 may be performed by the processor 60 of the server 15.

Method 300 may include receiving 310 in real-time over the communication network 40, from the computing device 25 associated with the user 20, real-time user activity data identifying at least one activity performed on the computing device by the user 20.

Method 300 may include receiving 320 in real time from the computing device, a plurality of user-inputted data elements from a plurality of interface elements of a graphical user interface displayed on a display of the computing device, where the plurality of user-inputted data elements identifies a plurality of user-specific data attributes of the user.

Method 300 may include identifying 330 in real-time over the communication network from a plurality of databases, potential user-specific knowledge information of the user based at least in part on at least one user-specific data attribute of the plurality of user-specific data attributes.

Method 300 may include generating 340 in real-time, at least one user-specific challenge question based at least in part on the potential user-specific knowledge information.

Method 300 may include transmitting 350 over the communication network to the computing device, a computer instruction configured to cause the computing device to display the at least one user-specific challenge question to the user on the display of the computing device.

Method 300 may include receiving 360 over the communication network from the computing device, an answer to the at least one user-specific challenge question by the user.

Method 300 may include determining 370 answer score to the user based at least in part on the answer being a correct answer based on the potential user-specific knowledge information of the user.

Method 300 may include determining 380 a behavioral score of the user based at least in part on the real-time user activity data of the user.

Method 300 may include determining 390 whether the user is or is not a fraudster based at least in part on the answer score and the behavioral score.

Method 300 may include performing 395 one of accepting the plurality of user-inputted data elements when the user is not the fraudster, or rejecting the plurality of user-inputted data elements when the user is the fraudster.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99, 999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs). The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 6:
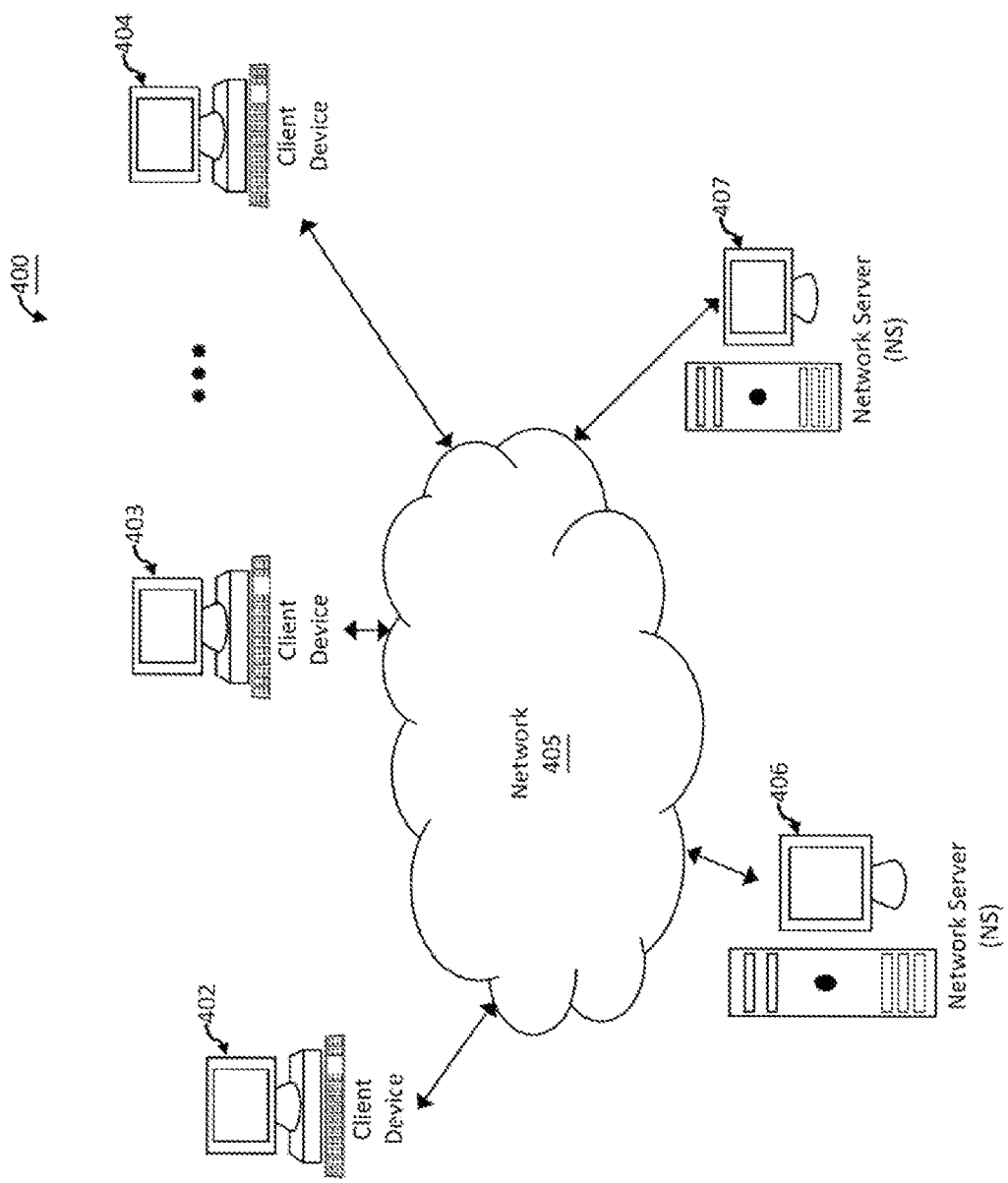
FIG. 6 depicts a block diagram of an exemplary computer-based system/platform in accordance with one or more embodiments of the present disclosure.

FIG. 6 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
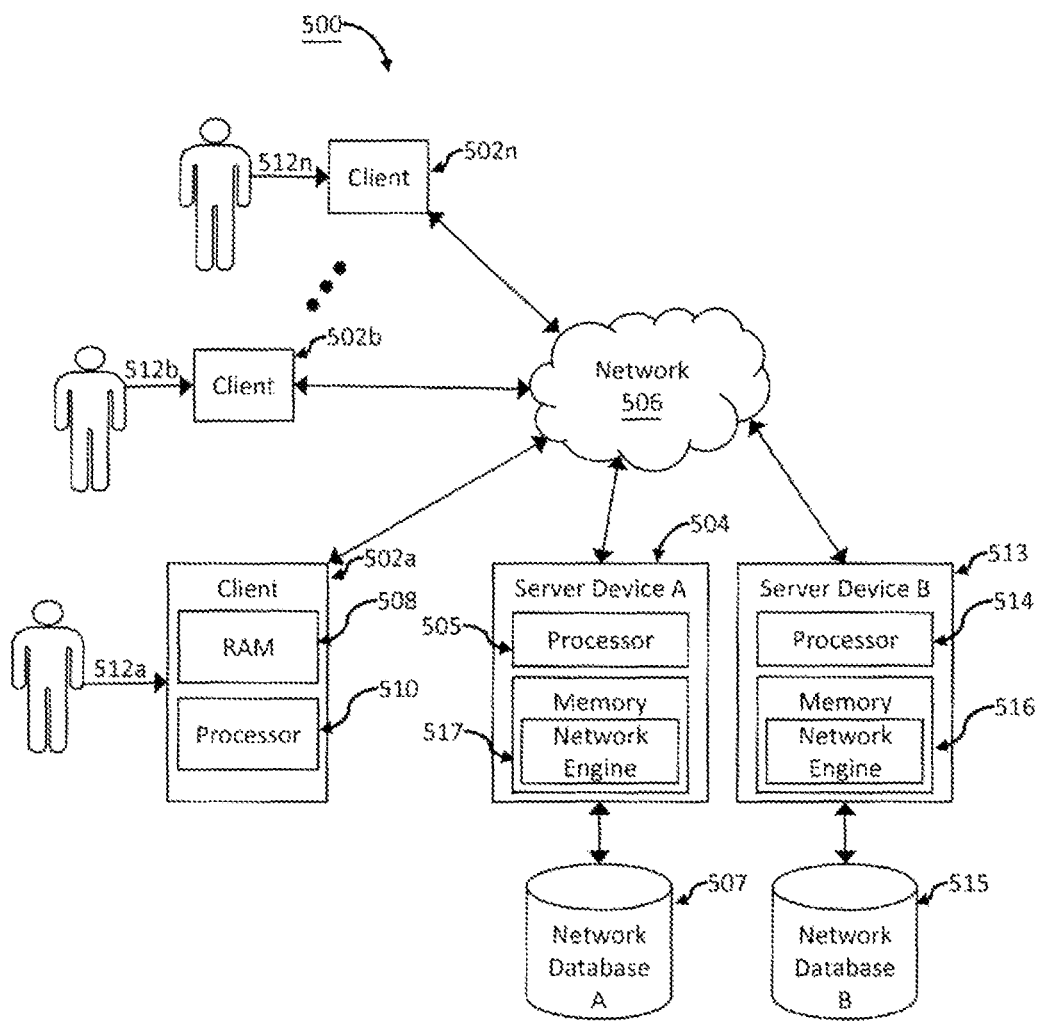
FIG. 7 depicts a block diagram of another exemplary computer-based system/platform in accordance with one or more embodiments of the present disclosure.

FIG. 7 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b through 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 7, exemplary server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
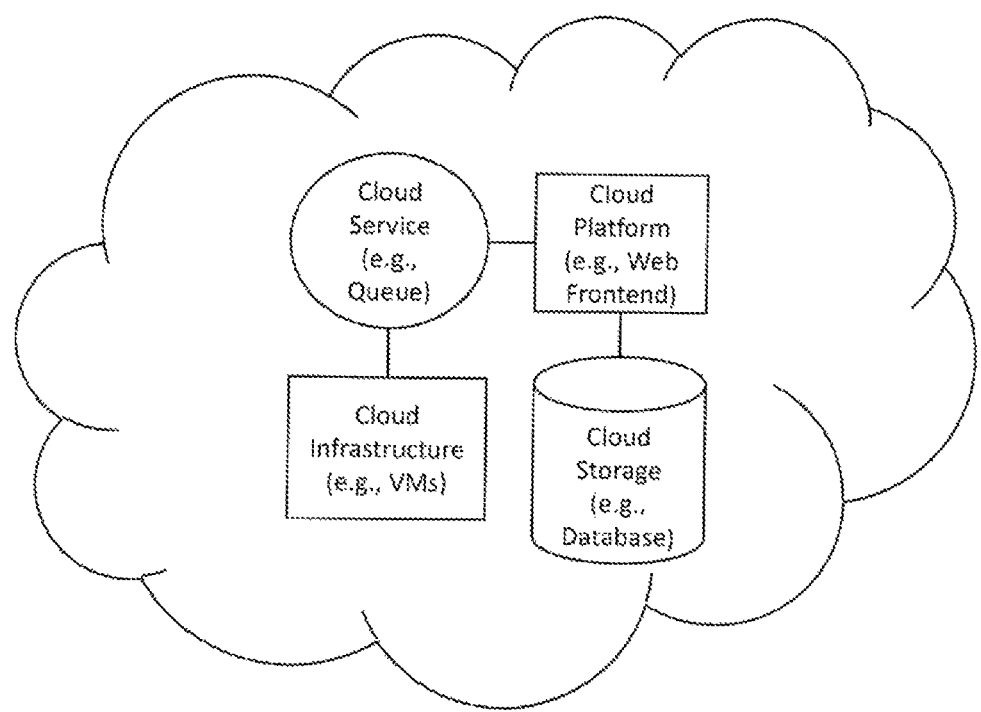
FIGS. 8 and 9 are diagrams illustrating implementations of cloud computing architecture/aspects with respect to which the disclosed technology may be specifically configured to operate, in accordance with one or more embodiments of the present disclosure.
Figure 9:
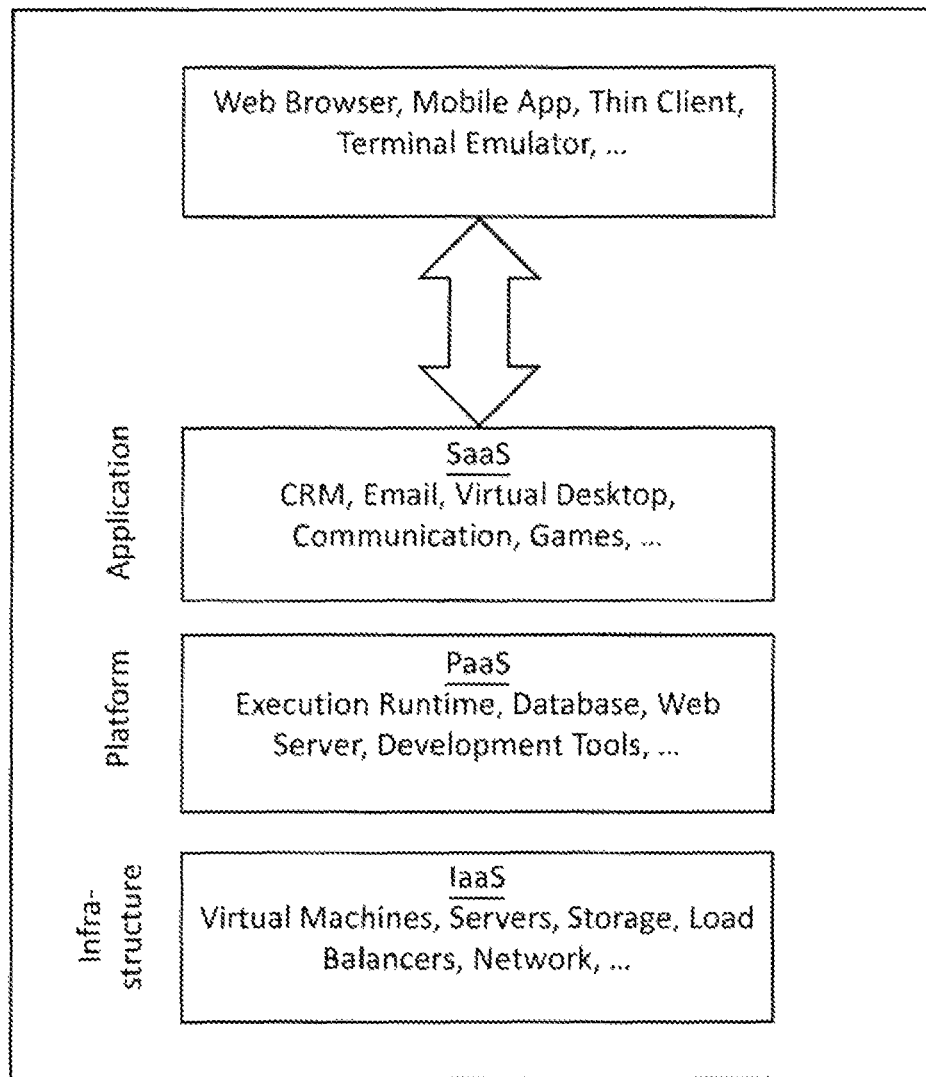

In some embodiments, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS), platform as a service (PaaS), and/or software as a service (SaaS). FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

At least some aspects of the present disclosure will now be described with reference to the following numbered clauses.

1. A method may include:

receiving, by a processor of a server, in real-time over a communication network, from a computing device associated with a user, real-time user activity data identifying at least one activity performed on the computing device by the user;

receiving, by the processor, in real time from the computing device, a plurality of user-inputted data elements from a plurality of interface elements of a graphical user interface displayed on a display of the computing device;

where the plurality of user-inputted data elements may identify a plurality of user-specific data attributes of the user;

identifying, by the processor, in real-time over the communication network from a plurality of databases, potential user-specific knowledge information of the user based at least in part on at least one user-specific data attribute of the plurality of user-specific data attributes;

generating, by the processor, in real-time, at least one user-specific challenge question based at least in part on the potential user-specific knowledge information;

transmitting, by the processor, over the communication network to the computing device, a computer instruction configured to cause the computing device to display the at least one user-specific challenge question to the user on the display of the computing device;

receiving, by the processor, over the communication network from the computing device, an answer to the at least one user-specific challenge question by the user;

determining, by the processor, an answer score to the user based at least in part on the answer being a correct answer based on the potential user-specific knowledge information of the user;

determining, by the processor, a behavioral score of the user based at least in part on the real-time user activity data of the user;

determining, by the processor, whether the user is or is not a fraudster based at least in part on:

i) the answer score and ii) the behavioral score; and performing, by the processor, one of:

i) accepting the plurality of user-inputted data elements when the user is not the fraudster, or ii) rejecting the plurality of user-inputted data elements when the user is the fraudster.

2. The method according to clause 1, where determining the user is the fraudster when:

(i) the answer score is below a predefined answer score threshold, and (ii) the behavioral score is below a predefined behavioral score threshold.

3. The method according to clauses 1 or 2, where the at least one user-specific data attribute of the user may be selected from the group consisting of a name of the user, a birthdate of the user, an address of the user, and an employer of the user.

4. The method according to any one of the preceding clauses, where receiving the real-time user activity data identifying the at least one activity performed on the computing device by the user may include receiving metadata of a web browser session from a web browser on the computing device.

5. The method according to any one of the preceding clauses, where receiving the real-time user activity data identifying the at least one activity performed on the computing device by the user may include receiving clickstream data from the computing device.

6. The method according to any one of the preceding clauses, where transmitting the computer instruction configured to cause the computing device to display the at least one user-specific challenge question to the user on the display of the computing device may include displaying a textbox to allow the user to enter the answer to the at least one user-specific challenge question.

7. The method according to any one of the preceding clauses, where transmitting the computer instruction configured to cause the computing device to display the at least one user-specific challenge question to the user on the display of the computing device may include displaying multiple choice answers to the at least one user-specific challenge question.

8. The method according to any one of the preceding clauses, further including searching, by the processor, over the communication network, a plurality of databases stored on a plurality of data servers through an application programming interface for the potential user-specific knowledge information of the user.

9. The method according to any one of the preceding clauses, where the plurality of interface elements of the graphical user interface may include data fields of an online form displayed on a webpage.

10. The method according to any one of the preceding clauses, where determining the behavioral score of the user based at least in part on the real-time user activity data of the user may include assessing whether the user left the webpage before entering any of the plurality of user-inputted data elements into the data fields of the online form, a time that the user took to answer the at least one user-specific challenge question, or both.

11. A system may include:

a memory for storing computer code; and a processor configured to execute the computer code that causes the processor to:

receive in real-time over a communication network, from a computing device associated with a user, real-time user activity data identifying at least one activity performed on the computing device by the user;

receive in real time from the computing device, a plurality of user-inputted data elements from a plurality of interface elements of a graphical user interface displayed on a display of the computing device;
  where the plurality of user-inputted data elements may identify a plurality of user-specific data attributes of the user;
  identify in real-time over the communication network from a plurality of databases, potential user-specific knowledge information of the user based at least in part on at least one user-specific data attribute of the plurality of user-specific data attributes;
  generate in real-time, at least one user-specific challenge question based at least in part on the potential user-specific knowledge information;
  transmit over the communication network to the computing device, a computer instruction configured to cause the computing device to display the at least one user-specific challenge question to the user on the display of the computing device;
  receive over the communication network from the computing device, an answer to the at least one user-specific challenge question by the user;
  determine an answer score to the user based at least in part on the answer being a correct answer based on the potential user-specific knowledge information of the user;
  determine a behavioral score of the user based at least in part on the real-time user activity data of the user;
  determine whether the user is or is not a fraudster based at least in part on:
    i) the answer score and
    ii) the behavioral score; and
  perform one of:
    i) accepting the plurality of user-inputted data elements when the user is not the fraudster, or
    ii) rejecting the plurality of user-inputted data elements when the user is the fraudster.

12. The system according to clause 11, where determining the user is the fraudster when:
  (i) the answer score is below a predefined answer score threshold, and
  (ii) the behavioral score is below a predefined behavioral score threshold.

13. The system according to clauses 11 or 12, where the at least one user-specific data attribute of the user may be selected from the group consisting of a name of the user, a birthdate of the user, an address of the user, and an employer of the user.

14. The system according to any one of clauses 11, 12, or 13, where the processor may be configured to receive the real-time user activity data identifying the at least one activity performed on the computing device by the user by receiving metadata of a web browser session from a web browser on the computing device.

15. The system according to any one of clauses 11, 12, 13 or 14, where the processor may be configured to receive the real-time user activity data identifying the at least one activity performed on the computing device by the user by receiving clickstream data from the computing device.

16. The system according to any one of clauses 11, 12, 13, 14 or 15, where the processor may be configured to transmit the computer instruction configured to cause the computing device to display the at least one user-specific challenge question to the user on the display of the computing device by displaying a textbox to allow the user to enter the answer to the at least one user-specific challenge question.

17. The system according to any one of clauses 11, 12, 13, 14, 15 or 16, where the processor may be configured to transmit the computer instruction configured to cause the computing device to display the at least one user-specific challenge question to the user on the display of the computing device by displaying multiple choice answers to the at least one user-specific challenge question.

18. The system according to any one of clauses 11, 12, 13, 14, 15, 16 or 17, where the processor may be further configured to execute the computer code that causes the processor to search over the communication network, a plurality of databases stored on a plurality of data servers through an application programming interface for the potential user-specific knowledge information of the user.

19. The system according to any one of clauses 11, 12, 13, 14, 15, 16, 17 or 18, where the plurality of interface elements of the graphical user interface may include data fields of an online form displayed on a webpage.

20. The system according to any one of clauses 11, 12, 13, 14, 15, 16, 17, 18 or 19, where the processor may be configured to determine the behavioral score of the user based at least in part on the real-time user activity data of the user by assessing whether the user left the webpage before entering any of the plurality of user-inputted data elements into the data fields of the online form, a time that the user took to answer the at least one user-specific challenge question, or both.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
  receiving, by a processor of a server, in real-time over a communication network, from a computing device associated with a user, real-time user activity data identifying at least one activity performed on the computing device by the user;
  receiving, by the processor, in real time from the computing device, a plurality of user-inputted data elements from a plurality of interface elements of a graphical user interface displayed on a display of the computing device;
    wherein the plurality of user-inputted data elements identifies a plurality of user-specific data attributes of the user;
  identifying, by the processor, in real-time over the communication network from a plurality of databases, potential user-specific knowledge information of the user based at least in part on at least one user-specific data attribute of the plurality of user-specific data attributes;
  generating, by the processor, in real-time, at least one user-specific challenge question based at least in part on the potential user-specific knowledge information;
  transmitting, by the processor, over the communication network to the computing device, a computer instruction configured to cause the computing device to display the at least one user-specific challenge question to the user on the display of the computing device;

receiving, by the processor, over the communication network from the computing device, an answer to the at least one user-specific challenge question by the user;

determining, by the processor, an answer score to the user based at least in part on the answer being a correct answer based on the potential user-specific knowledge information of the user;

determining, by the processor, a behavioral score of the user based at least in part on the real-time user activity data of the user;

wherein the real-time user activity data of the user comprises at least:

i) an activity indicator identifying when the user left an online page, comprising the plurality of interface elements, displayed on the graphical user interface, before entering any of the plurality of user-inputted data elements into the plurality of interface elements, and ii) a time indicator that identifies a time that the user took to answer the at least one user-specific challenge question;

determining, by the processor, whether the user is or is not a fraudster based at least in part on:

i) the answer score, and ii) the behavioral score; and performing, by the processor, one of:

i) accepting the plurality of user-inputted data elements when the user is not the fraudster, or ii) rejecting the plurality of user-inputted data elements when the user is the fraudster.

2. The method according to claim 1, wherein determining the user is the fraudster when:

the answer score is below a predefined answer score threshold, and (ii) the behavioral score is below a predefined behavioral score threshold.

3. The method according to claim 1, wherein the at least one user-specific data attribute of the user is selected from the group consisting of a name of the user, a birthdate of the user, an address of the user, and an employer of the user.

4. The method according to claim 1, wherein receiving the real-time user activity data identifying the at least one activity performed on the computing device by the user comprises receiving metadata of a web browser session from a web browser on the computing device.

5. The method according to claim 1, wherein receiving the real-time user activity data identifying the at least one activity performed on the computing device by the user comprises receiving clickstream data from the computing device.

6. The method according to claim 1, wherein transmitting the computer instruction configured to cause the computing device to display the at least one user-specific challenge question to the user on the display of the computing device comprises displaying a textbox to allow the user to enter the answer to the at least one user-specific challenge question.

7. The method according to claim 1, wherein transmitting the computer instruction configured to cause the computing device to display the at least one user-specific challenge question to the user on the display of the computing device comprises displaying multiple choice answers to the at least one user-specific challenge question.

8. The method according to claim 1, further comprising searching, by the processor, over the communication network, a plurality of databases stored on a plurality of data servers through an application programming interface for the potential user-specific knowledge information of the user.

9. The method according to claim 1, wherein the plurality of interface elements of the graphical user interface comprises data fields of an online form displayed on a webpage.

10. The method according to claim 1, wherein the generating of the at least one user-specific challenge question comprises prioritizing each of the at least one user-specific challenge question based at least in part on a difficulty level, a security level, or both.

11. A system, comprising:

a memory for storing computer code; and a processor configured to execute the computer code that causes the processor to:

receive in real-time over a communication network, from a computing device associated with a user, real-time user activity data identifying at least one activity performed on the computing device by the user;

receive in real time from the computing device, a plurality of user-inputted data elements from a plurality of interface elements of a graphical user interface displayed on a display of the computing device;

wherein the plurality of user-inputted data elements identifies a plurality of user-specific data attributes of the user;

identify in real-time over the communication network from a plurality of databases, potential user-specific knowledge information of the user based at least in part on at least one user-specific data attribute of the plurality of user-specific data attributes;

generate in real-time, at least one user-specific challenge question based at least in part on the potential user-specific knowledge information;

transmit over the communication network to the computing device, a computer instruction configured to cause the computing device to display the at least one user-specific challenge question to the user on the display of the computing device;

receive over the communication network from the computing device, an answer to the at least one user-specific challenge question by the user;

determine an answer score to the user based at least in part on the answer being a correct answer based on the potential user-specific knowledge information of the user;

determine a behavioral score of the user based at least in part on the real-time user activity data of the user;

wherein the real-time user activity data of the user comprises at least:

i) an activity indicator identifying when the user left an online page, comprising the plurality of interface elements, displayed on the graphical user interface, before entering any of the plurality of user-inputted data elements into the plurality of interface elements, and ii) a time indicator that identifies a time that the user took to answer the at least one user-specific challenge question;

determine whether the user is or is not a fraudster based at least in part on:

i) the answer score, and ii) the behavioral score; and perform one of:

i) accepting the plurality of user-inputted data elements when the user is not the fraudster, or ii) rejecting the plurality of user-inputted data elements when the user is the fraudster.

12. The system according to claim 11, wherein determining the user is the fraudster when:
   the answer score is below a predefined answer score threshold, and
   (ii) the behavioral score is below a predefined behavioral score threshold.

13. The system according to claim 11, wherein the at least one user-specific data attribute of the user is selected from the group consisting of a name of the user, a birthdate of the user, an address of the user, and an employer of the user.

14. The system according to claim 11, wherein the processor is configured to receive the real-time user activity data identifying the at least one activity performed on the computing device by the user by receiving metadata of a web browser session from a web browser on the computing device.

15. The system according to claim 11, wherein the processor is configured to receive the real-time user activity data identifying the at least one activity performed on the computing device by the user by receiving clickstream data from the computing device.

16. The system according to claim 11, wherein the processor is configured to transmit the computer instruction configured to cause the computing device to display the at least one user-specific challenge question to the user on the display of the computing device by displaying a textbox to allow the user to enter the answer to the at least one user-specific challenge question.

17. The system according to claim 11, wherein the processor is configured to transmit the computer instruction configured to cause the computing device to display the at least one user-specific challenge question to the user on the display of the computing device by displaying multiple choice answers to the at least one user-specific challenge question.

18. The system according to claim 11, wherein the processor is further configured to execute the computer code that causes the processor to search over the communication network, a plurality of databases stored on a plurality of data servers through an application programming interface for the potential user-specific knowledge information of the user.

19. The system according to claim 11, wherein the plurality of interface elements of the graphical user interface comprises data fields of an online form displayed on a webpage.

20. The system according to claim 11, wherein the processor is configured to generate the at least one user-specific challenge question by prioritizing each of the at least one user-specific challenge question based at least in part on a difficulty level, a security level, or both.

* * * * *